United States Patent
Li

(10) Patent No.: US 6,630,982 B2
(45) Date of Patent: Oct. 7, 2003

(54) COLOR AND INTENSITY TUNABLE LIQUID CRYSTAL DEVICE

(75) Inventor: Zili Li, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 91 days.

(21) Appl. No.: 09/982,759

(22) Filed: Oct. 18, 2001

(65) Prior Publication Data

US 2003/0075721 A1 Apr. 24, 2003

(51) Int. Cl.⁷ ............................................. C09K 19/02
(52) U.S. Cl. .................... 349/175; 349/176; 349/185
(58) Field of Search .............................. 349/115, 168, 349/175, 176, 185, 706.139

(56) References Cited

U.S. PATENT DOCUMENTS

| | | | |
|---|---|---|---|
| 4,645,304 A | * 2/1987 | Kawamura et al. | 349/111 |
| 4,737,014 A | * 4/1988 | Green | 385/123 |
| 4,810,062 A | * 3/1989 | Aoki et al. | 349/3 |
| 5,159,475 A | * 10/1992 | Fergason et al. | 349/196 |
| 5,576,867 A | 11/1996 | Baur et al. | |
| 5,587,820 A | * 12/1996 | May et al. | 349/116 |
| 5,600,464 A | 2/1997 | Ohe et al. | |
| 6,094,249 A | * 7/2000 | Robinson et al. | 349/141 |
| 6,137,456 A | * 10/2000 | Bhagavatula et al. | 345/7 |
| 6,159,454 A | * 12/2000 | Schuhmacher et al. | 424/59 |

FOREIGN PATENT DOCUMENTS

JP     61254932 A  * 11/1986  ........... G02F/1/133

OTHER PUBLICATIONS

Ming Xu and Deng–Ke Wang; "Electrooptical Properties of Dual–Frequency Cholesteric Liquid Crystal Reflective Display and Drive Scheme"; Jpn. J. Appl. Phys., vol. 38, 1999, pp. 6827–6830.

* cited by examiner

Primary Examiner—Eddie Lee
Assistant Examiner—Pan E Brock, II
(74) Attorney, Agent, or Firm—Daniel K. Nichols

(57) ABSTRACT

A color tunable pixel (100) includes a cholesteric liquid crystal (110). The helical pitch of the cholesteric liquid crystal (110) is controlled by applying electrical fields (202, 302) of varying strength and/or frequency perpendicular to an initial helical axis (H) of cholesteric liquid crystal (110) in order to shift the hue of light reflected by the cholesteric liquid crystal (110). The reflectivity of the cholesteric liquid crystal (110) may be controlled by applying an electric field (402) perpendicular to the initial helical axis (H) at a frequency at which the cholesteric liquid crystal (110) exhibits a negative dielectric anisotropy. Alternatively the visible light reflectivity may be controlled by applying an electric field to shift the reflectance of the cholesteric liquid crystal (110) into the infrared portion of the spectrum, or in another embodiment by allowing the cholesteric liquid crystal (110) to revert to an ultraviolet reflected state.

21 Claims, 3 Drawing Sheets

COLOR AND INTENSITY TUNABLE LIQUID CRYSTAL DEVICE

FIELD OF THE INVENTION

This invention pertains to liquid crystal displays. More particularly this invention pertains to color cholesteric liquid crystal displays.

BACKGROUND OF THE INVENTION

Along with the proliferation of computing, and communication devices, the use of liquid crystal displays has increased. Liquid crystal displays are used in a variety of devices including cell phones, laptop computers, portable digital assistants, and increasingly, as desk top computer monitors.

Common types of color liquid crystal displays have complicated structures including front and back substrates, color filter arrays, back reflectors (in the case of reflective displays), front and back polarizers, front and back alignment layers, and precisely aligned electrodes located on opposite sides of a liquid crystal containment cell. In the manufacture of such liquid crystal displays, great care must be taken to assure that electrodes formed on one containment wall are properly aligned with electrodes formed on the other containment wall. The latter necessity increases manufacturing costs.

Liquid crystal displays in which the electrodes are all formed on a single containment wall have been proposed. Nonetheless, multiple alignment layers, polarizers, and color filter arrays that must be precisely aligned are still required.

What is needed is a liquid crystal display that has a reduced component count.

What is needed is a liquid crystal display that is more easily manufactured, and especially avoids the need for critical alignment between elements (e.g., electrodes, color filter array) formed on one containment wall, with elements formed on a second containment wall.

BRIEF DESCRIPTION OF THE DRAWINGS

The features of the invention believed to be novel are set forth in the claims. The invention itself, however, may be best understood by reference to the following detailed description of certain exemplary embodiments of the invention, taken in conjunction with the accompanying drawings in which:

DETAILED DESCRIPTION OF THE PREFERRED EMBODIMENT

Figure 1:
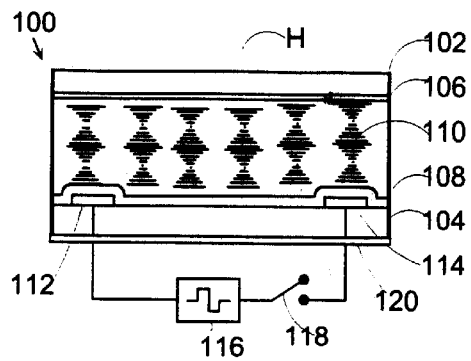
FIG. 1 is a schematic fragmentary sectional elevation view of a color tunable pixel of a liquid crystal display in a first operating state according to a preferred embodiment of the invention.

While this invention is susceptible of embodiment in many different forms, there are shown in the drawings and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. In the description below, like reference numbers are used to describe the same, similar, or corresponding parts in the several views of the drawings.

FIG. 1 is a schematic fragmentary sectional elevation view of a color tunable pixel 100 of a liquid crystal display in a first operating state according to a preferred embodiment of the invention. The pixel 100 comprises a first wall 102, and a second wall 104. Either the first wall 102 or the second wall 104 is transparent so as to allow light that is modulated to enter the pixel 100. Preferably, the first wall 102 and the second wall 104 are transparent. The first wall 102 is parallel to the second wall 104.

A cholesteric liquid crystal 110 is disposed between the first wall 102, and the second wall 104. The cholesteric liquid crystal 110 is preferably a dual frequency liquid crystal material, that has a dielectric anisotropy of a first sign over a first range of frequencies, and a dielectric anisotropy of a second sign over a second range of frequencies. Dielectric anisotropy is the difference between the relative permittivity measured parallel to the axes of elongated molecules that make up the cholesteric liquid crystal, and the relative permittivity measured perpendicular to the axes of the molecules.

Figure 5:
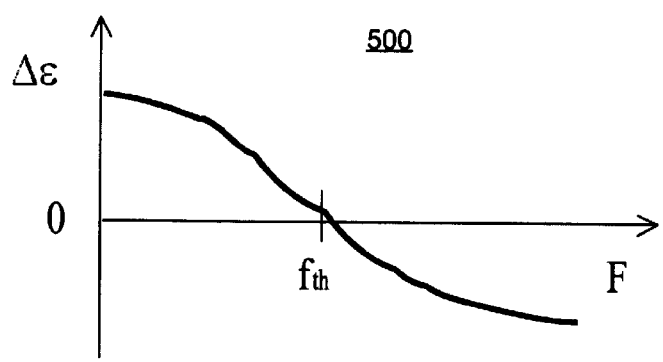
FIG. 5 is graph of dielectric anisotropy versus frequency for a cholesteric liquid crystal used in the color tunable pixel of FIG. 1 according to the preferred embodiment of the invention.

FIG. 5 is an exemplary graph 500 of dielectric anisotropy versus frequency for the cholesteric liquid crystal 110 used in the color tunable pixel 100 according to the preferred embodiment of the invention. The ordinate of the graph is dielectric anisotropy, and the abscissa is frequency. The cholesteric liquid crystal 110 has a positive anisotropy in a first range that extends from zero up to a threshold frequency Fth, and a negative dielectric anisotropy for at least a range of frequencies above the threshold frequency. The dispersion of the cholesteric liquid crystal 110 can lead to reversions of the dielectric anisotropy at frequencies beyond the domain shown in the graph 500.

Referring once again to FIG. 1, the pixel 100 further comprises an alignment layer 106 supported on the first wall 102 facing the cholesteric liquid crystal 110. The alignment layer 106 preferably comprises a rubbed polymer, e.g., polyimide. The alignment layer 106 causes the cholesteric liquid crystal 110 to initially align itself with its helical axis H perpendicular to the alignment layer 106, and first wall 102.

A first electrode 112 and a second electrode 114 are supported in spaced relation on the second wall 104. Since both electrodes 112, 114 are located on the second wall 104 the difficulty involved in manufacturing a liquid crystal display in which critical alignment must be achieved between electrodes borne on two opposed walls is avoided. The first 112 and second 114 electrodes are substantially co-planar. The first electrode 112 is preferably one of a plurality of spaced electrodes 902 (FIG. 9) that are connected together, and the second electrode 114 is preferably one of a second plurality of electrodes 904 (FIG. 9) that are connected together and interdigitated with the first plurality of electrodes 902. The pixel 100 preferably includes a plurality of fragments such as illustrated in FIG. 1 arranged side by side.

A high surface energy film 108 is supported on the second wall 104 facing the cholesteric liquid crystal 110. The high surface energy film covers the first 112 and second 114 electrodes. The high surface energy film 108 is preferably a polymer, and more preferably polyamide. The high surface energy film 108 promotes the above mentioned alignment of the cholesteric liquid crystal 110 in which the helical axis H is perpendicular to the alignment layer 106, and first wall 102. A light absorbing layer 120 is applied to the second wall 104 opposite the high energy film 108.

A drive signal source 116 is provided. When a switch 118 is closed, the drive signal source 116 is coupled to the first 112, and second electrodes 114. The switch 118 is illustrated to emphasize that the state of the pixel 100 illustrated in FIG. 1 corresponds to no signal being applied to the first 112, and second 114 electrodes. In practice the discrete switch 118 is dispensed with and the drive signals source 116 is adapted to output signals as needed. Signals output by the drive signal source 116 according to the preferred embodiment and two alternative embodiments of the invention are described below in more detail with reference to FIGS. 6–8.

In the state shown in FIG. 1 the cholesteric liquid crystal 110 is arranged in a known helical structure which typifies cholesteric liquid crystals. In such a structure, long molecules which make up the cholesteric liquid crystal 110 are arranged in successive layers. Within each layer the long molecules are substantially parallel. Between each pair of successive layers there is an incremental change in the direction of alignment of the long molecules. Over many successive layers, vectors describing the orientation of molecules rotate tracing out a helix. The axis H of the helix, is perpendicular alignment layer 106. The helix, i.e., the rate at which the direction of alignment of long molecules changes as a function of depth (measured perpendicular to alignment layer 106) is characterized by a helical pitch that is equal to the distance over which the orientation of the long molecules rotates through $2\pi$.

In FIGS. 1–4 the rotation of long molecules of the cholesteric liquid crystal 110 is illustrated as a periodic change of length of lines representing long molecules, as seen when viewed from a fixed perspective as the long molecules rotate. For purposes of illustration, in FIG. 1, one complete pitch period of the cholesteric liquid crystal 110 is shown. In practice there are preferably at least about 10 pitch periods of the cholesteric liquid crystal 110 between the alignment layer 106 and high surface energy film 108.

In the state shown, the cholesteric liquid crystal 110 exhibits a wavelength dependent Bragg-type reflectance. For perpendicular (angle of incidence equal zero) incidence (with respect to first wall 102), the wavelength corresponding to the center wavelength of spectral reflectance of the cholesteric liquid crystal 110 is equal to:

$$\bar{n} \cdot P$$

where, $\bar{n}$ is the average index of refraction of the cholesteric liquid crystal 110, and P is the helical pitch that characterizes the cholesteric liquid crystal 110.

The center wavelength of spectral reflectance is somewhat dependent on the angle of incidence. However a user's line of sight to a display is ordinarily close to perpendicular to the display, so that light that reaches the users eye after reflection by the display, is light that was incident on the display at an angle of incidence close to zero.

According to the preferred embodiment of the invention, the cholesteric liquid crystal 110 is formulated so that its natural pitch (pitch with no applied field) and index of refraction yield a peak reflectance in the blue portion of the visible spectrum. The initial helical pitch may be controlled by controlling the proportion of chiral dopant to nematic compound in the cholesteric liquid crystal 110.

Figure 2:
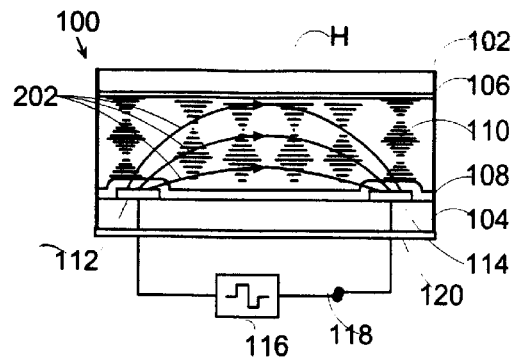
FIG. 2 is a schematic fragmentary sectional elevation view that shows the color tunable pixel of FIG. 1 in a second operating state.
Figure 9:
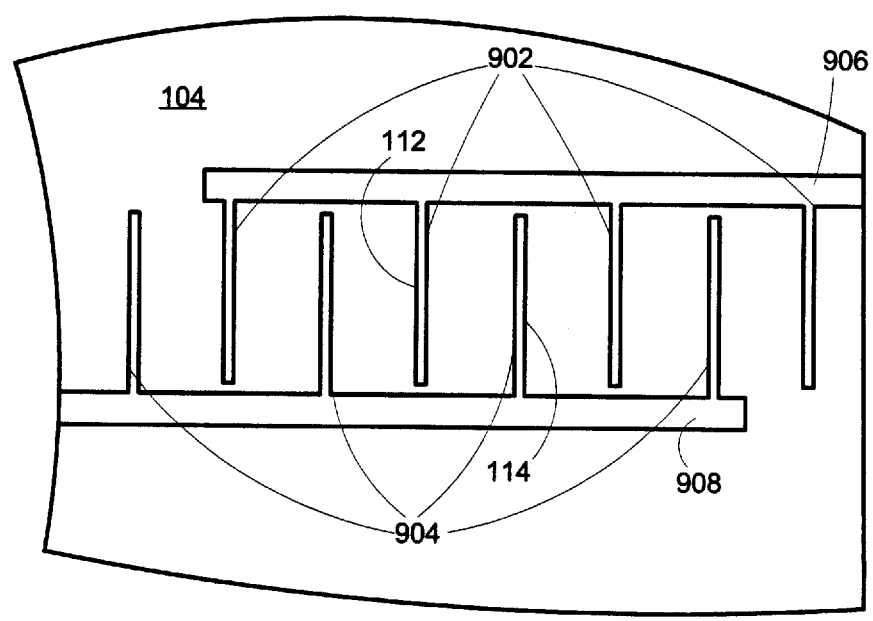
FIG. 9 is a plan view of interdigitated pixel electrodes according to the preferred embodiment of the invention.

FIG. 2 is a schematic fragmentary sectional elevation view that shows the color tunable pixel 100 of FIG. 1 in a second operating state. In FIG. 2 the switch 118 is closed to couple the drive signal source 116 to the first 112 and second 114 electrodes, and the drive signal source 116 is configured to output a first bipolar signal characterized by a first frequency that falls within the range of frequencies in which the dielectric anisotropy of the cholesteric liquid crystal 110 is positive. The application of the aforementioned signal to the first 112, and second 114 electrodes causes a first electric field 202 to be established in the cholesteric liquid crystal 110. At the instant of time shown, the first electric field 202 emanates from the first electrode 112, and terminates at the second electrode 114. In the preferred case that the first electrode 112 is one of the first plurality of electrodes 902 (FIG. 9), electric fields would emanate from each of the first plurality of electrodes 902 and terminate at each of the second plurality of electrodes 904 (FIG. 9). The first electric field 202 is substantially perpendicular to the helical axis H. The first electric field includes a substantial electric field component parallel to first 102 and second 104 walls. The first electric field 202 oscillates with the applied signal.

The first electric field 202 increases the helical pitch of the cholesteric liquid crystal 110 thereby shifting the peak in its spectral reflectance to a longer wavelength (e.g., to the green portion of the visible spectrum), and changing the hue of light reflected from pixel 100 when it is illuminated with a broadband source e.g., ambient light. Broadband light includes a continuum of wavelength components. The first electric field 202 increases the helical pitch because the molecules that make up the cholesteric liquid crystal 110 tend to align with the first electric field 202.

Figure 3:
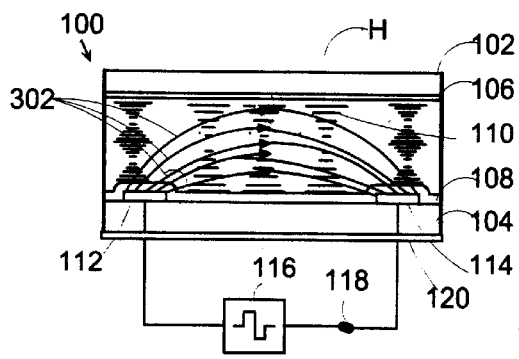
FIG. 3 is a schematic fragmentary sectional elevation view that shows the color tunable pixel of FIG. 1 in a third operating state.

FIG. 3 is a schematic fragmentary sectional elevation view that shows the color tunable pixel 100 in a third operating state. To achieve the state illustrated in FIG. 3, the switch 118 is closed, and the drive signal source 116 is preferably configured to output a second bipolar signal that is characterized by a higher amplitude than the first bipolar signal, and by the same frequency as the first bipolar signal.

The second bipolar signal causes a second electric field 302 to be established in cholesteric liquid crystal 110. The second electric field 302 is also substantially perpendicular to the initial helical axis H. The second electric field 302 is stronger than the first electric field 202. The second electric field 302 further increases the helical pitch P of the cholesteric liquid crystal 110 thereby shifting the peak in its spectral reflectance to an even longer wavelength (e.g., to the red portion of the visible spectrum), and further changing the hue of light reflected from the pixel 100 when it is illuminated with a broad band source.

Thus the hue of light reflected from the pixel 100 can be modulated by controlling the amplitude of signals applied to the first 112 and second 114 electrodes. Therefore there is no need to incorporate an array of spectrally selective filters into the liquid crystal display of which the pixel 100 is a part. The manufacture of liquid crystal displays is thereby greatly simplified.

Figure 4:
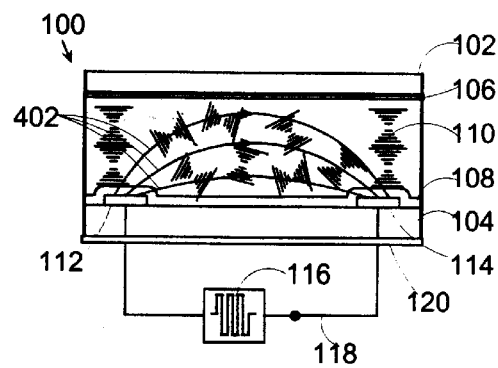
FIG. 4 is a schematic fragmentary sectional elevation view that shows the color tunable pixel of FIG. 1 in a fourth operating state.

FIG. 4 is a schematic fragmentary sectional elevation view that shows the color tunable pixel 100 of FIG. 1 in a fourth operating state. The fourth operating state is achieved by closing the switch 118, and configuring the drive signal source 116 to output an oscillating signal that is characterized by a second frequency at which the cholesteric liquid crystal 110 manifests a negative dielectric anisotropy. The application of the oscillating signal at the second frequency establishes a third electric field 402 that oscillates at the second frequency. The third electric field 402 includes a substantial component parallel to the plane of the first 104 and second 106 walls. At the instant of time shown, the third electric field 402 emanates from the first electrode 112, and terminates at the second electrode 114. Because the relative permittivity measured perpendicular the axes of the long molecules that make up the cholesteric liquid crystal 110, is greater than the relative permittivity measured parallel to the long molecules at the second frequency, the third electric field exerts a torque on the long molecules that tends to align them perpendicular to the third electric field. Because the latter alignment is inconsistent with the ordered helical arrangement illustrated in FIGS. 1–3, the ordered helical arrangement is disrupted, and the cholesteric liquid crystal 110 is caused to assume a transmissive scattering state known as a focal conic state. The transmissive scattering of light of the cholesteric liquid crystal 110, when it is in the focal conic state is not spectrally selective. The focal conic state transmits incident ambient light to the absorbing layer 120 where it is absorbed.

Thus, the reflectivity of the color tunable pixel 100 can be controlled by applying the oscillating signal characterized by the second frequency.

Figure 6:
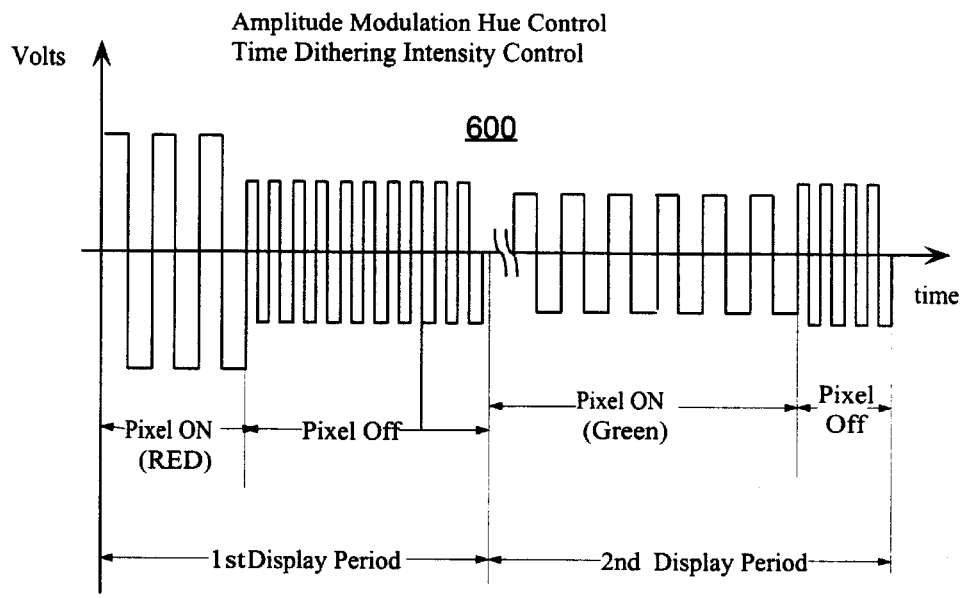
FIG. 6 is a graph showing signals used to drive the color tunable pixel of FIG. 1 according to the preferred embodiment of the invention.

FIG. 6 is a graph 600 showing signals used to drive the color tunable pixel 100 of FIG. 1 according to the preferred embodiment of the invention. The abscissa of the graph 600 is time, and the ordinate of the graph is voltage (i.e., the voltage applied between the first 112 and second 114 electrodes). The domain of the graph 600 includes a first display period followed by a second display period. The first display period and the second display period are separated in time (e.g., by the inverse of a frame rate of signals used to drive the liquid crystal display of which the tunable color pixel 100 is a part).

The first display period includes a first sub-period in which the pixel 100 is turned on (e.g., made reflective) and its spectral reflectance is tuned to a wavelength in the red portion of the visible spectrum. During the first subperiod the second bipolar signal, discussed above with reference to FIG. 3 is output by the drive signal source 116 (FIGS. 1–4). The first display period, further comprises a second sub-period in which the reflectivity of the color tunable pixel is substantially turned off (there may be some measurable but insignificant residual reflectivity). During the second sub-period the oscillating signal discussed above with reference to FIG. 4, i.e., a signal characterized by a frequency at which the cholesteric liquid crystal 110 manifests a negative anisotropy, is applied to the first 112 and second 114 electrodes.

The length of the first display period is preferably chosen to be less than about the time over which the human eye integrates observed images. This time is believed to be no more than about 17 millisecond. By choosing the length of the first display period to be less than the latter time, it is possible to control the effective intensity perceived by a viewer observing the color tunable pixel 100 by controlling a percentage of the total duration of the first display period taken by first sub-period. Note also that the time-average-intensity of reflected light is modulated.

The second display period includes a first sub-period during which the reflectivity of the pixel 100 is turned on, and the color of the reflected light is tuned to green. During the second display period, the first bipolar signal, discussed above with reference to FIG. 2 is output by the drive signal source 116 (FIGS. 1–4). Note that in the preferred embodiment color tuning is achieved by controlling the amplitude of the signals applied during the first sub-periods of the first and second display periods. The second display period also includes a second sub-period during which the oscillating signal discussed above with reference to FIG. 4 is output by the drive signal source 116 (FIGS. 1–4). The duration of the second display period is also chosen in view of the integration time that characterizes human visual perception, and the effective intensity of green light is also controlled by setting the duration of the first sub-period of the second display period relative to the total duration of the second display period. The first sub-period of the first display period, during which the color of the pixel 100 is tuned to red is shorter than first sub-period of the second display period during which the color of the pixel 100 is tuned to green. Consequently, an observer viewing the pixel will observe a relatively dark, red state of the pixel 100 followed by a relatively bright green state of the pixel 100. The green state is relatively bright due to the large percentage of the display period occupied by the first-sub period.

The cholesteric liquid crystal 110 used in combination with the signals illustrated in FIG. 6 and in FIGS. 7–8 described below, is preferably formulated so that its average index and natural (zero applied field) pitch yield a reflectance centered in the blue portion of the visible spectrum. In the latter case, the hue of reflected light is shifted to the blue by applying weak signals or no signal to the first 112, and second 114 electrodes during the first sub-periods of display periods.

Note that in all cases, the order of the first and second sub-periods of each display period can be reversed. Moreover, each display period, alternatively comprises a plurality of first sub-periods and/or a plurality of second sub periods.

Using bipolar signals has the advantage that precipitation of ionic impurities that may be present in the cholesteric liquid crystal 110 within the tunable color pixel 100 is reduced.

Figure 7:
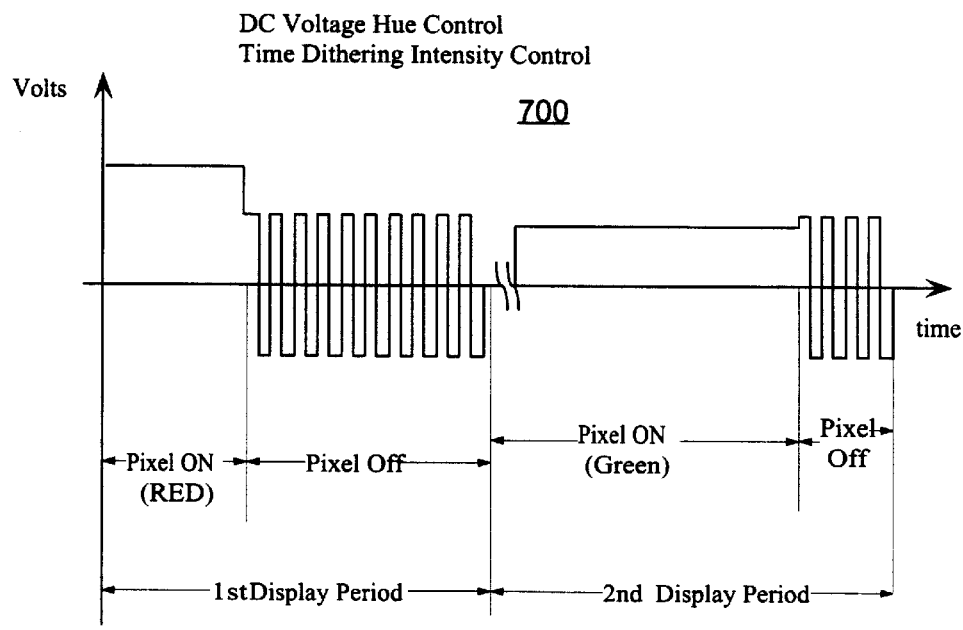
FIG. 7 is a graph showing signals used to drive the color tunable pixel of FIG. 1 according to a first alternative embodiment of the invention.

FIG. 7 is a graph 700 showing signals used to drive the color tunable pixel 100 of FIG. 1 according to a first alternative embodiment of the invention. According to the first alternative embodiment of the invention, DC (zero-frequency) signals are used during the first sub-periods of the first and second display periods in lieu of bipolar signals to control the color of reflected light. The amplitude of the DC signals are controlled in order to control the helical pitch of the cholesteric liquid crystal 110.

Graph 700 includes first and second display periods each of which include first and second sub-periods.

During the first sub-period of the first display period of graph 700, a DC signal of a first voltage is used to set the helical pitch of the cholesteric liquid crystal 110 to give a reflectance centered in the red portion of the visible spectrum (for near normal incidence). During the first sub-period of the second display period of graph 700, a DC signal of a second voltage, that is lower than the first voltage, is used to set the helical pitch of the cholesteric liquid crystal to give a reflectance centered in the green portion of the spectrum.

The perceived intensity of reflected light is controlled by controlling the relative duration of the sub-periods.

Figure 8:
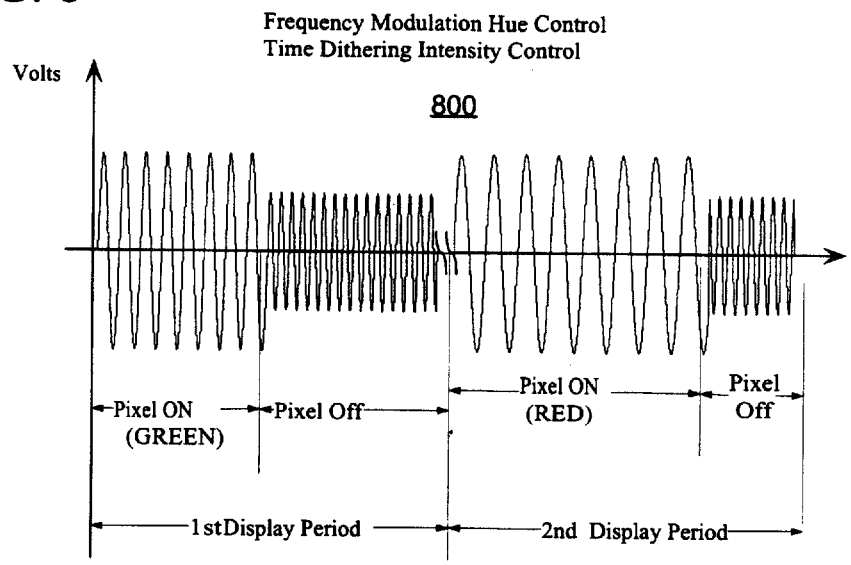
FIG. 8 is a graph showing signals used to drive the color tunable pixel of FIG. 1 according to a second alternative embodiment of the invention.

FIG. 8 is a graph 800 showing signals used to drive the color tunable pixel 100 of FIG. 1 according to a second alternative embodiment of the invention. The driving scheme illustrated in FIG. 8 makes use of the fact that the cholesteric liquid crystal 110 exhibits a positive anisotropy of varying magnitude at a plurality of frequencies, e.g., over a range of frequencies. In lieu of using bipolar or DC signals of varying magnitude to tune the color of reflected light, as illustrated with reference to FIGS. 6 and 7 respectively, signals of the same magnitude but at different frequencies chosen from the aforementioned plurality of frequencies are used.

Graph 800 includes first and second display periods each of which includes first and second sub-periods.

During the first sub-period of the first display period a first sinusoidal signal characterized by the first frequency at which the cholesteric liquid crystal 110 exhibits a positive anisotropy of a first magnitude is applied across the electrodes 112, 114 (FIGS. 1–4) in order to set the pitch of the cholesteric liquid crystal 110 to yield a reflectance centered in the green portion of the visible spectrum. During the first sub-period of the second display period a second sinusoidal signal characterized by a second frequency that is less than the first frequency and at which the cholesteric liquid crystal 110 exhibits a positive anisotropy of a second magnitude that is greater than the first magnitude is applied across the electrodes 112, 114 (FIGS. 1–4). Since according to the preferred embodiment of the invention the dielectric anisotropy of the cholesteric liquid crystal 110 decreases from a positive value at zero frequency to zero at the threshold frequency (See FIG. 5), lower frequency signals within the positive anisotropy frequency range yield increased helical pitches, compared to higher frequency signals of the same magnitude within the positive anisotropy frequency range. Thus, whereas the first sinusoidal signal leads to reflectance centered in the green portion of the visible spectrum, the second sinusoidal signal being characterized by a lower frequency than the first sinusoidal signal leads to reflectance in the red portion of the visible spectrum.

During second sub-periods of the first and second display periods application of a third sinusoidal signal at a frequency at which the cholesteric liquid crystal 110 exhibits a negative dielectric anisotropy is used to convert the cholesteric liquid crystal 110 to the focal conic state and turn off the reflectivity. The duration of the first sub-periods relative to the display periods controls the effective (perceived) intensity of light modulated by the color tunable pixel 100.

According to a third alternative embodiment of the invention, both the amplitude and frequency of signals used to tune the color of the pixel 100 are varied.

FIG. 9 is a plan view of interdigitated pixel electrodes according to the preferred embodiment of the invention. FIG. 9 shows a plan view of the second wall 104 bearing the first plurality of electrodes 902 and the second plurality of electrodes 904. The first plurality of electrodes 902 are all coupled to a first conductive strip 906, and the second plurality of electrodes 904 are all coupled to a second conductive strip 908. The first plurality of electrodes 902 includes the first electrode 112, whereas the second plurality of electrodes 904 includes the second electrode 114. The first plurality of electrodes 902 are intedigitated with the second plurality of electrodes 904. By using interdigitated electrodes, the signal voltage required to achieve an electric field sufficient to achieve the pitch dilation described above, is lowered. If only two electrodes are used to establish a field across the entire pixel 100, a higher signal voltage is required. It is desirable to provide a display that does not require high voltage drive signals.

According to a fourth alternative embodiment of the invention rather than applying a signal to the first 112 and second 114 electrodes at a frequency at which the cholesteric liquid crystal 110 exhibits a negative dielectric anisotropy, in order turn off the reflectance, a high amplitude signal is applied to the first 112 and second 114 electrodes at a frequency at which the cholesteric liquid crystal 110 exhibits a positive dielectric anisotropy in order to establish an electric field in the cholesteric liquid crystal 110 that is strong enough to increase the helical pitch so that the reflectance of the cholesteric liquid crystal 110 shifts into the infrared portion of the spectrum. In such a state, because infrared is imperceptible to human vision, the reflectance of the cholesteric liquid crystal is effectively turned off. In the fourth alternative embodiment, the cholesteric liquid crystal 110 need not be dual frequency cholesteric liquid crystal. By controlling the fraction of a display period during which the reflectance is in the infrared, the effective intensity of light modulated by the color tunable pixel 100 is controlled. The total display period is preferably less than about the time over which the human eye integrates observed scenes.

According to a fifth alternative embodiment of the invention the cholesteric liquid crystal 110 is formulated so that its helical pitch, and average index of refraction lead to reflectance in the ultraviolet portion of the spectrum when the pitch is unaffected by an applied field. In the fifth alternative embodiment, the natural (zero applied field) state of the cholesteric liquid crystal 110 is used as the off state. Signals characterized by one or more amplitudes, and at one or more frequencies within a range of frequencies in which the cholesteric liquid crystal exhibits positive anisotropy are then applied to the first 112 and second 114 electrodes in order to establish electric fields for controlling the pitch of the cholesteric liquid crystal in order to tune the hue of reflected light. By controlling the percentage of a display period in which the cholesteric liquid crystal 10 is left in its natural ultraviolet reflecting state, the effective perceived intensity of light reflected by the color tunable pixel 100 is controlled. In the fifth and sixth alternative embodiments light would usually be incident on the color tunable pixel at an angle of incidence close to zero.

According to a sixth alternative embodiment, the light absorbing layer 120 is eliminated, and the color tunable pixel 100 is used as a transmissive light modulator. An array of pixels of the type shown in FIG. 1 may be used as a transmissive spatial light modulator in, for example, or directly viewed back lighted display or a projection light display.

According to a seventh alternative embodiment of the invention, the high surface energy film 108 is a rubbed film that establishes a preferential alignment direction for the cholesteric liquid crystal material 110 proximate the second wall 104. In the seventh alternative embodiment the number of pitch periods of the cholesteric liquid crystal material 110 is fixed, however an electric field that includes a substantial component perpendicular to the initial helical axis H and that is characterized by a frequency at which the cholesteric liquid crystal 110 exhibits a positive dielectric anisotropy (e.g., field 202, 302) dilates the pitch of a portion of the cholesteric liquid crystal material 110, and thereby alters the color of light reflected by the cholesteric liquid crystal material 110.

The present invention provides pixels designs for color liquid crystal displays that can be manufactured at a reduced cost due to a reduction in the component count (e.g., the elimination of two polarizers, color filter array, and back reflectors), and due to the elimination of the necessity of achieving a critical alignment between electrodes borne on front and back walls.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A liquid crystal display comprising:
   a first wall;
   a second wall;
   a cholesteric liquid crystal disposed between the first wall and the second wall, the cholesteric liquid crystal characterized by a positive anisotropy at a first frequency, and a negative anisotropy at a second frequency;
   a first electrode and a second electrode for establishing an electric field in the cholesteric liquid crystal, that includes a substantial electric field component that is parallel to the first wall;
   a drive signal source that is coupled to the first electrode and the second electrode, for selectively applying a first signal at the first frequency, and a second signal at the second frequency to the first electrode, and the second electrode.

2. The liquid crystal display according to claim 1 wherein:
   the first electrode and the second electrode are supported on the first wall.

3. The liquid crystal display according to claim 1 wherein:
   the first electrode is one of a first plurality of electrodes that are coupled together;
   the second electrode is one of a second plurality of electrodes that are coupled together; and
   the first plurality of electrodes is intedigitated with the second plurality of electrodes.

4. The liquid crystal display according to claim 1 wherein:
   the first frequency is zero.

5. The liquid crystal display according to claim 1 wherein:
   the first frequency is non-zero.

6. The liquid crystal display according to claim 1 wherein:
   the drive signal source is capable of varying an amplitude of the first signal.

7. The liquid crystal display according to claim 6 wherein:
   the first electrode and the second electrode are supported on the first wall.

8. The liquid crystal display according to claim 1 wherein:
   the cholesteric liquid crystal is exhibits a positive anisotropy of varying magnitude over a range of frequency; and
   the drive signal source is capable of outputting signals at a plurality of frequencies in the range of frequency.

9. The liquid crystal display according to claim 8 wherein:
   the first electrode and the second electrode are supported on the first wall.

10. A liquid crystal display comprising:
    a first wall;
    a second wall;
    a cholesteric liquid crystal disposed between the first wall and the second wall, the cholesteric liquid crystal characterized by a helical axis that is substantially perpendicular to the first wall;
    a first electrode and a second electrode arranged in spaced relation for establishing an electric field that includes a substantial electric field component that is parallel to the first wall;
    a drive signal source coupled to the first electrode and the second electrode for selectively applying one of a plurality of signals that are characterized by a plurality of magnitudes to the first and second electrodes;
    whereby, a selectable strength electric field is applied to the cholesteric liquid crystal to vary a pitch of the cholesteric liquid crystal, and shift a spectral reflectance band of the cholesteric liquid crystal.

11. The liquid crystal display according to claim 10 wherein:
    the first electrode and the second electrode are supported on the first wall.

12. The liquid crystal display according to claim 10 wherein:
    the cholesteric liquid crystal is, in the absence of an applied electric field, characterized by a helical pitch that that corresponds to reflectance centered at an ultraviolet wavelength.

13. The liquid crystal display according to claim 12 wherein:
    the first electrode and the second electrode are supported on the first wall.

14. The liquid crystal display according to claim 10 wherein:
    the drive signal source is capable of generating a signal of sufficient amplitude to establish an electric field of sufficient strength to increase a helical pitch that characterizes the cholesteric liquid crystal to a length that corresponds to reflectance centered at an infrared wavelength.

15. The liquid crystal display according to claim 14 wherein:
    the first electrode and the second electrode are supported on the first wall.

16. A liquid crystal display comprising:
    a first wall;
    a second wall;
    a cholesteric liquid crystal, that is characterized by a positive anisotropy of varying magnitude over a range of frequency, and is characterized by a helical axis that is substantially perpendicular to the first wall, disposed between the first wall and the second wall;
    a first electrode and a second electrode arranged in spaced relation for establishing an electric field that includes a substantial electric field component that is parallel to the first wall;
    a drive signal source for selectively applying two or more signals selected from a plurality of signals characterized by a plurality of frequencies in the range of frequency.

17. The liquid crystal display according to claim 16 wherein:
    the first electrode and the second electrode are supported on the first wall.

18. A method of time-average-intensity modulating visible light, the method comprising the steps of:
    impinging visible light at an angle of incidence on a cholesteric liquid crystal that is characterized by helical axis, a positive anisotropy over a first range of frequencies, and an average index of refraction and a helical pitch that result in a reflectance peak at the angle of incidence, at an ultraviolet wavelength; and applying an electric field that is oriented substantially perpendicular to the helical axis to the cholesteric liquid crystal to increase the helical pitch and shift the reflectance peak to a visible wavelength.

19. A method of time-average-intensity modulating visible light, the method comprising the steps of:

impinging visible light at an angle of incidence on a cholesteric liquid crystal that is characterized by helical axis, a positive anisotropy over a range of frequencies, and an average index of refraction and a helical pitch that result in a reflectance peak at the angle of incidence, at a visible light wavelength; and applying an electric field that is oriented substantially perpendicular to the helical axis and is characterized by a frequency within the range of frequencies to the cholesteric liquid crystal to increase the helical pitch and shift the reflectance peak to an infrared wavelength.

20. A method of time-average-intensity and hue modulating visible light, the method comprising the steps of:

impinging visible light that includes a plurality of wavelength components at an angle of incidence on a cholesteric liquid crystal that is characterized by a positive anisotropy over a first range of frequency, a negative anisotropy over a second range of frequency, and an initial helical axis;

applying a first electrical field that includes an electric field component that is substantially perpendicular to the initial helical axis and is characterized by a frequency within the first range of frequency to the cholesteric liquid crystal in order to hue modulate the visible light; and applying a second electric field that is substantially perpendicular to the initial helical axis and is characterized by a frequency within the second range of frequency to the cholesteric liquid crystal in order to time-average-intensity modulate the visible light.

21. The method according to claim 20 wherein:

the step of applying the first electric field includes the sub-steps of:

emanating the first electric field from a first electrode; and terminating the first electric field at a second electrode that is substantially co-planar to first electrode; and the step of applying the second electric field includes the sub-steps of:

emanating the second electric field from the first electrode; and terminating the second electric field at the second electrode.

* * * * *